Figure 1:
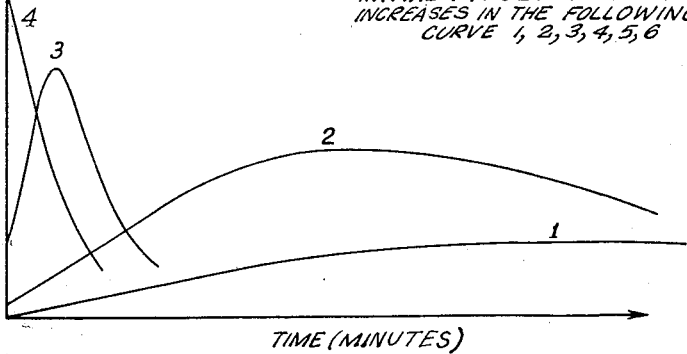

BROMITE CONCENTRATION VS. TIME
+ 20°C
INITIAL HYPOBROMITE CONCENTRATION
INCREASES IN THE FOLLOWING ORDER:
CURVE 1, 2, 3, 4, 5, 6

-20 TO -10°C

United States Patent Office 3,085,854
Patented Apr. 16, 1963

3,085,854
PRODUCTION OF BROMINE OXYGEN COMPOUNDS
Jean Meybeck, Mulhouse, René Kircher, Argenteuil, and Jacqueline Leclerc, Paris, France, assignors to Societe d'Etudes Chimiques Pour l'Industrie l'Agriculture, Paris, France
Filed Apr. 19, 1957, Ser. No. 654,041
Claims priority, application France Apr. 24, 1956
20 Claims. (Cl. 23—85)

This invention relates to a method for producing concentrated solutions of metal bromites and to alkali metal and alkaline earth metal salts of bromous acid produced by this method.

Various authorities have shown that solutions of alkali hypobromites when subjected to suitable conditions evolve gradually to a condition wherein the hypobromite is partially converted to the corresponding bromite. The bromites thus detected, however, have only been obtained heretofore in highly dilute solution together with the bromide, bromate and hydroxide of the alkali metal, as well as extraneous salts utilized as buffer compounds. Solid bromites have never been heretofore separated, and hence no descriptions of their properties is to be found in the literature on the subject.

The reason is, that even in those cases where conditions are most favourable for the conversion process, the investigators have never succeeded in obtaining bromite concentrations higher than 20 grams active bromine per liter (active bromine being defined as the weight of bromine releasable from one liter solution). Attempts to concentrate the dilute solutions obtained or separate bromite in the solid state failed, and it was believed that bromite salts could only exist in highly diluted solutions up to the aforesaid concentration. There was, incidentally, no way of telling in advance that concentrated solutions and/or solid bromite would be stable enough to make it possible to separate them.

Due to the lack of a method for concentrating bromite solutions or producing solid bromites, use of bromite solutions was restricted in the past. It was, indeed, known that bromites, the same as hypobromites, selectively oxidize, for instance, arsenites in the cold while this oxidation of arsenites could not be achieved with bromates. (Supplement to Mellor's Comprehensive Treatise of Inorganic and Theoretical Chemistry, Suppl. II, Part I, page 753, published by Longmans, Green & Co. in 1956.) However, it is obvious to a skilled chemist that full use of the selective oxidizing power of bromites such as sodium bromite, could not be made, unless solutions of determined bromite concentration could be obtained, which required the availability of crystalline, pure bromite salts.

It is, therefore, an object of our invention to produce new oxidizing agents in the form of certain solid, crystalline salts of bromous acid which are easy to transport, and from which aqueous solutions can be prepared that have new and specific oxidizing properties.

It is another object of our invention to provide a process for producing alkali metal and alkaline earth metal salts of bromous acid, in solid crystallized form for use as a source for the afore-said oxidizing as well as brominating agents.

Our research on this subject has now established that the production of alkali bromite solutions of higher concentrations is a practical possibility, and they have succeeded in preparing, from such solutions, crystallized alkali bromite which was never previously produced.

We have further discovered that alkali-earth bromites could be prepared in a similar way. The existence of these compounds has never been mentioned in the literature of which the applicants are aware, whether in solution or in solid form.

Since the general conditions for preparing concentrated solutions both of alkali and alkali-earth bromites are broadly the same, the said general conditions will be disclosed hereinafter without the particular cation contemplated being specifically pointed out. To clarify the description however, some typical numerical data will be given by way of illustration, which relates to sodium, it being understood that the sodium cation is selected for purposes of example only.

The hypobromite solution stock subjected to the conversion conditions can be prepared in any suitable way, as by reacting bromine with an alkali, reacting a hypochlorite with a bromide, or by electrolysis, etc. The feasibility of preparing concentrated bromite solutions is predicated on the following properties which have been discovered by us.

First, the bromite concentration in the resulting solution is increasingly high as the concentration in the initial solutions is high. In other words, when operating under certain predetermined conditions to be specified below, the use of initially concentrated hypobromite solutions does not cause the decomposition of the bromite.

Secondly, the conversion ratio or yield of the hypobromite-to-bromite conversion depends on a number of physico-chemical factors control of which makes it possible to improve greatly on the yields obtained by earlier investigators.

A basis discovery of ours has been that, in contrast with what could be anticipated concerning the stability of bromites, it is feasible to start from hypobromite solutions of higher concentration than what was heretofore used. It has further been found that the conversion yield of hypobromite to bromite could be increased by observing certain predetermined pH and temperature ranges.

The hypobromite conversion reaction can be represented by the following two equations:

(1) $2MeBrO \rightarrow MeBrO_2 + MeBr$
(2) $MeBrO_2 + MeBrO \rightarrow MeBrO_3 + MeBr$

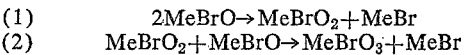

wherein Me represents an alkali or alkali-earth metal atom. The bromite $MeBrO_2$ which forms according to Reaction 1 tends to react with the hypobromite MeBrO according to Reaction 2. However, in order that the over-all yield of the hypobromite-to-bromite conversion Reaction 1 be high in the initial solution having a given hypobromite concentration, certain definite prescriptions as to pH and temperature must be observed. In particular, the solutions should be maintained at a temperature not higher than 0° C., it being understood that if higher temperatures are used, while some bromite may still be obtained, the yield will be substantially less.

The pH value in the initial solutions should preferably be also held within predetermined limits. Thus, for solutions initially containing 200 to 300 grams per liter active bromine in the form of sodium hypobromite, the pH should preferably be within a range of from 10.5 to 11. The pH adjustment should preferably be performed by directly adding an excess of one or the other of the reagents used in preparing the hypobromites, i.e. without using buffer ions of foreign character. The absence of foreign ions in the solution appreciably simplifies the final separation step of the solid bromite.

Investigation of the spontaneous conversion of dilute hypobromite solutions with time, as performed by earlier workers, has shown that the bromite concentration passes through a peak value and then drops off. Our work has shown, in addition to this, that the lower the initial concentration, the slower the rate of change in the solutions at a given temperature. The curves 1, 2, 3 and 4 of the graph indicated as FIG. 1 in the accompanying drawings illustrate, against time, the changes in bromite content (in terms of grams active bromine per liter) in solutions having respectively increasing initial hypobromite concentrations, the four curves all being plotted for an initial temperature of substantially 20° C.

Figure 2:
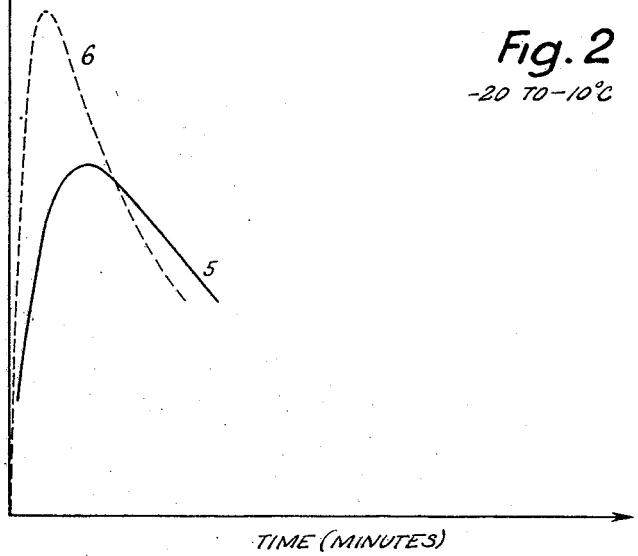

Moreover, a decrease in temperature reduces the rate of conversion of the solutions and makes it possible, therefore, to use initial solutions of higher concentration. This is illustrated by curve 5 in FIG. 2, which is plotted for a solution having the same initial concentration as that of curve 4 in FIG. 1, but at an operating temperature within the range −20° C. to −10° C. instead of +20° C. for FIG. 1.

It is seen that at +20° C. the peak concentration value cannot practically be attained since decomopsition sets in and proceeds too rapidly. On the other hand, when working below −20° C., the maximum bromite concentration is obtained in a period of about 10 minutes.

Curve 6 (FIG. 2) is similar to curve 5 but for a much higher hypobromite concentration in the initial solution. This curve shows that temperature reduction makes it possible to use initial solutions of much higher hypobromite concentrations, such that if used at ordinary temperature any bromite formed therein would instantly break down.

It has been found that with the above specified conditions, i.e. at temperature of less than 0° C. and with an initial pH value in the range of 10.5–11.0, a conversion yield of hypobromite to bromite could be achieved of about 42 to 45% with the use of starting solutions initially containing 200 to 300 grams of active bromine per liter in sodium hypobromite form.

It has further been found that, for satisfactory results, the initial pH value of the solution should be selected increasingly high according as the hypobromite concentration in said initial solution is high. However, the optimum pH value should still be kept within a predetermined range for a given range of concentrations, when the remaining factors, i.e. temperature and conversion time or rate, are held constant.

By studying the conversion process in initial solutions having varying initial hypobromite concentrations, the applicants have established that the maximum conversion yield of hypobromite to bromite increases as the hypobromite concentration in the initial solution is increased. It is, accordingly, doubly advantageous to use high-concentration initial solutions, since this increases the post-conversion bromite concentration both because of the higher active bromine content in the initial solution and owing to the increased hypobromite-to-bromite conversion yield achievable.

As indicated above, the rate of the conversion process of a hypobromite solution at a given temperature is increasingly rapid as the initial concentration is high. In order to prevent a practically instantaneous breakdown of the bromite formed from a highly concentrated hypobromite solution, it is therefore necessary properly to adjust the rate of the process by controlling the remaining two factors, i.e. temperature and pH value, on which said rate depends; thus a decrease in temperature slows down the conversion process and an increase in the initial pH has a similar effect.

In accordance with the above, conversion yields of 50% to 55% have been obtained for example, by using sodium hypobromite solutions containing about 500 grams per liter active bromine maintained at an operating temperature of about 0° C., with the initial pH of the solutions in the range 11–12. The maximum bromite concentration is attained after a time that increases from a few minutes to two hours as the pH value is increased from 11 to 12.

In addition to their high bromite concentrations, the solutions thus obtained have yet another advantage over the solutions prepared from less concentrated initial solutions. This is the fact that they contain relatively less hypobromite thereby facilitating the ultimate separation of the solid bromite. It should be understood that after the conversion process the active bromine is present in the solutions in the forms of bromite, hypobromite and bromate, with the relative proportions between the three compounds being approximately as follows when using initial sodium hypobromite solutions at 500 grams active bromine per liter. Per 100 parts active bromine, 50 parts occur as bromite, 25 as hypobromite and 25 as bromate. When using solutions initially containing from 200 to 300 grams per liter active bromine, the corresponding figures are 40, 40 and 20 parts respectively.

In order to stop the conversion process at the point where the bromite concentration is at its peak value, the solutions are stabilized by suddenly raising their pH value through addition of a suitable amount of the alkali corresponding to the hypobromite used, e.g. NaOH in the case of sodium hypobromite. The unconverted hypobromite is then eliminated by means of a suitable reducing agent substantially inert to the bromite. For this purpose ammonia may for example be used in substantially stoichiometrical amount so as to produce the reaction $$3NaBrO + 2NH_3 \rightarrow N_2 + 3NaBr + 3H_2O$$

In this case the reduction should preferably be performed at a sufficiently low temperature to improve the specific action of ammonia on the hypobromite and avoid as far as possible simultaneous breakdown of the bromite. Thus the reaction may be conducted in the temperature range from −15° C. to −10° C.; the amount of bromite that breaks down is always less than 10% of the total quantity of bromite present in the solution.

As a general rule, when using initial solutions having as high as possible a hypobromite concentration, highly concentrated bromite solutions are obtained wherein the proportion of unconverted hypobromite is relatively low. This is an especial advantage in connection with the subsequent step involving elimination of the hypobromite.

By applying the above teachings, the applicants have prepared alkali and alkali-earth bromite solutions of sufficiently high concentration to enable the bromites to be separated in the crystal state. This has been done without requiring the handling of large volumes of solution.

For example, sodium bromite has been prepared, and was found to consist of yellow crystals. The crystals consist of the bromite hydrate $NaBrO_2 \cdot 3H_2O$ and from this the anhydrous bromite $NaBrO_2$ was produced, e.g. by dehydration in vacuo. The anhydrous bromite thus produced was quite definitely identifiable under X-ray examination, as evidenced by the following tabulation of interreticular spacings, expressed in A. units:

| d | 4.38 | 3.66 | 3.20 | 2.95 | 2.90 | 2.88 | 2.52 | 2.35 | 2.07 |
|---|------|------|------|------|------|------|------|------|------|
| I | 25 | 9 | 11 | 19 | 100 | 10 | 3 | 60 | 6 |
| d | 1.97 | 1.90 | 1.84 | 1.82 | 1.56 | 1.51 | 1.48 | 1.44 | |
| I | 2 | 2 | 8 | 30 | 1 | 2 | 2 | 21 | |

In the above table there is indicated adjacent each interreticular spacing value, the corresponding microdensitometrical brightness measurement for the corresponding spectrum line in a powder-spectography test.

Sodium bromite is a stable compound and has been preserved in solid condition without decomposiiton.

By way of example, the separation of sodium bromite has been accomplished by the following method. After elimination of the hypobromite, the solutions, now containing sodium bromite, sodium bromide and sodium bromate, is concentrated until it is saturated in bromite. This concentration may be effected, for example, by evaporation in vacuo, preferably at a temperature below 30° C., and the sodium bromide and bromate that precipitate being removed by filtration or otherwise. The resulting solution is saturated in all three sodium salts, bromite, bromide and bromate. Depending on the free soda content in the solution, the sodium bromite concentration at saturation may attain approximately 700 to 850 grams per liter active bromine at 20° C.

It was found that, by cooling a solution saturated in bromite, bromide and bromate and containing free soda, a solid precipitate forms having a much higher bromite content than in the mother solution. For example, a solution having the following composition in g. per 100 g. of solution

| | G. |
|---|---|
| $NaBrO_2$ | 20.15 |
| $NaBrO_3$ | 0.95 |
| NaBr | 20.75 |
| NaOH | 15.40 | which corresponds to 835 g./l. active bromine in bromite form, is cooled from 20° C. to 0° C.

There is thus obtained a solid comprising: 72.8% $NaBrO_2 \cdot 3H_2O$ and 22.3% $NaBr \cdot 2H_2O$, and small amounts of bromate. Thus, the solid contains 66% of the bromite present in the solution and, after separation of the precipitate the remaining solution may be recycled.

The impure solid thus obtained may be recrystallized in an aqueous soda solution to yield $NaBrO_2 \cdot 3H_2O$ in pure form.

From the pure sodium bromite, bromite solutions may be obtained which do not contain any other bromine-containing salt nor any other foreign ion. Such solutions have never been prepared heretofore. The concentration of such solutions moreover may be varied over a wide range. In an alkaline medium the solutions are stable and may be stored for long periods. Thus it has been found that the title of a solution containing 157 g./l. active bromine in bromite form did not noticeably vary over a month, although the solution was stored under normal illumination and at a ordinary temperature. It was also found that very highly concentrated solutions (790 g./l. active bromine in bromite form) suffered a reduction in title of less than 10% in four months storage, when stored in the dark at about 5° C.

We have further separated lithium bromite in the form of greenish yellow crystals from concentrated solutions of this salt. The solutions were obtained, for example, by conversion of lithium hypobromite solutions containing 320 to 330 g./l. active bromine wherein the initial pH was 10.5 to 10.7, operating at about 0° C. In these conditions the conversion yield of hypobromite to bromite was of the order of 50 to 53%.

In a similar manner, potassium bromite has been produced by evaporating solutions prepared by conversion of potassium hypobromite solutions containing 300 g./l. active bromine with an initial pH value of 11.2, operating at about −10° C. The conversion yield in this case is about 33%.

As regards earth-alkali bromites, as already indicated the same general conditions as for preparing solutions of alkali bromites are applicable, the various factors controlling the conversion yield acting in the same sense for earth-alkali solutions as for alkali solutions. These solutions therefore are produced by using generator solutions having the highest possible concentrations in earth-alkali hypobromite, obtained by any suitable process. Thus, advantageous results have been obtained for example using starting solutions of barium hypobromite containing 200 to 220 g./l. active bromine and solutions of calcium hypobromite containing 300 to 330 g./l. active bromine. It will be evident that the particular pH and temperature conditions to be used in the conversion process depend on the particular cation involved. Just as with alkali bromites, the separation of earth-alkali bromites in solid form can be effected by crystallisation; the operating conditions again depend on the cation involved since different bromites have different degrees of solubility. The particular operating conditions are illustrated by specific numerical data in the examples to follow.

The earth-alkali bromites may be used for the preparation of the corresponding alkali bromites, the latter being obtained by double decomposition reaction between an earth-alkali bromite and a sodium salt such as the sulfate, carbonate or the like.

Some examples will now be given for purposes of illustration but not of limitation, of the preparation of crystallized bromites as well as other examples illustrating the particular pH and temperature conditions suitable for the production of concentrated solutions of the respective bromites.

*Example 1*

To 1 liter of an aqueous soda solution containing 308 grams NaOH, bromine was gradually added in a substantially stoichiometrical proportion to produce sodium hypobromite. The solution was cooled during the addition of bromine. After 620 g. bromine were thus added the pH of the solution was about 11.4. The resulting solution contained 510 g./l. active bromine. The temperature was maintained at about 0° C. for 50 minutes and there was then obtained a solution in which 53.5% of the total oxidizing capacity was in the form of sodium bromite corresponding to a bromite concentration of 273 g./l. in terms of active bromine.

To stabilize the solution there were added 65 cc. per liter of soda at 20 N concentration. The unconverted sodium hypobromite was then eliminated by adding 93.5 cc./liter of ammonia solution at 5 N concentration and cooling so as to hold down the temperature to the approximate range of −15 to −10° C. The resulting solutions had the following composition by weight:

| | Percent |
|---|---|
| $NaBrO_2$ | 5.8 |
| $NaBrO_3$ | 2.65 |
| NaBr | 35.7 |
| NaOH | 4.0 | corresponding to a bromite content of 210 g./l. in terms of active bromine.

The solution was then concentrated in vacuo at a temperature of about 10 to 15° C., which resulted in the precipitation of sodium bromide and sodium bromate. The solution was filtered at ambient temperature (about 20° C.) to separate the precipitate. The filtrate composition was the following, by weight:

| | Percent |
|---|---|
| $NaBrO_2$ | 18.8 |
| $NaBrO_3$ | 1.0 |
| NaBr | 23.5 |
| NaOH | 13.0 | corresponding to a bromite content of 802 g./l. in terms of active bromine.

This solution was then cooled from 20° C. to 0° C. and a precipitate was separated by filtration having the following composition after the impregnating mother-liquor was drained off: $NaBrO_2 \cdot 3H_2O$ 69.7%, $NaBr \cdot 2H_2O$ 28.2% and $NaBrO_3$ 2%.

On cooling, 100 grams of solution at 20° C. yielded 27 grams of a solid of the above composition, corresponding to a 71.5% yield of bromite for the precipitate.

The impure solid was recrystallized in a N/10 soda solution using the quantity of solution just sufficient to dissolve the solid. The resulting product titred 99.6%

$$NaBrO_2 \cdot 3H_2O$$

and only contained traces of bromate.

Example 2

One liter of a solution containing 148.5 g. NaOH and 300 g. bromine was prepared with energetic cooling. The solution had a pH 10.7 and was maintained at 0° C. for 15 minutes. A solution was then obtained wherein 45% of the total oxidizing power was in the form of sodium bromite. The bromite concentration attained 135 g./l. in terms of active bromine.

This solution was stabilized by adding about 5 cc./l. of 20 N soda solution thereby raising the pH to within the range 12 to 12.5. The soda hypobromite remaining in solution was removed by adding 5 N ammonia solution at about 0° C., using a stoichiometric amount of ammonia with respect to the hypobromite. The bromite was separated as in Example 1.

Example 3

An aqueous suspension of baryta was prepared by adding 304 g. $Ba(OH)_2$ to 1175 g. water. 284 g. bromine were then added gradually while agitating and cooling the suspension. A barium hypobromite solution was thus obtained having pH 11.2 and containing 221 g./l. active bromine.

This solution was maintained at about 0° C. for 58 minutes whereupon 55% of the hypobromite content were found to have converted to bromite. $Ba(OH)_2$ was then added in an amount of 16 g./l. to arrest the conversion, raising the pH to 12.9. The unconverted barium hypobromite was eliminated by adding a stoichiometrical quantity of ammonia solution while maintaining the temperature at about −5° C.

During the conversion process a little barium bromate precipitated. The liquid was filtered to separate the precipitate, and a solution was obtained having the following composition by weight:

|  | Percent |
|---|---|
| $Ba(BrO_2)_2$ | 3.85 |
| $Ba(BrO)_2$ | 0.4 |
| $BaBr_2$ | 24.2 |
| $Ba(OH)_2$ | 1.15 |

This solution was concentrated in vacuo at the surrounding temperature of about 20° C. until the weight of the solution attained 51.5% of the initial weight. The concentrate was cooled to 0° C. and a solid was precipitated which after removal of the impregnating solution had the following composition by weight:

|  | Percent |
|---|---|
| $Ba(BrO_2)_2$ | 64.6 |
| $Ba(BrO_3)_2$ | 3.1 |
| $Ba(OH)_2 \cdot 8H_2O$ | 32.3 |

In this way 80% of the barium bromite initially present in the solution was precipitated out.

Example 4

A barium hypobromite solution was prepared by suspending 270 g. $Ba(OH)_2$ in one liter water and adding bromine in an amount corresponding to 97% of the theoretical quantity required for the formation of hypobromite. The resulting solution titred 220 g./l. active bromine and had a pH 13.6. The solution was adjusted to pH 11.3 by adding an appropriate amount of bromine and the solution was maintained at a temperature of about 0° C. After 70 minutes of the conversion process 57.2% of the initial hypobromite were converted into bromite and the solution contained 125.8 g./l. active bromine in the form of barium bromite. This solution was treated in a similar manner to the solution obtained in Example 3.

Example 5

A calcium hypobromite solution was prepared containing 320 g./l. active bromine. The solution was adjusted initially to pH 10.65 by means of bromine and was held at about 0° C. After 40 minutes of the conversion process the solution contained 185.6 g./l. active bromine as bromite, corresponding to a conversion yield of 58% in terms of hypobromite. This solution was stabilized by adding $Ca(OH)_2$ and the unconverted calcium hypobromite was then removed.

Example 6

A calcium hypobromite solution having the same concentration as that used in Example 5 was adjusted to an initial pH value of 10.9 and maintained at about 0° C. In these conditions it was found that after two hours 57% of the hypobromite initially present were converted into bromite.

What we claim is:

1. A method of producing concentrated solutions of alkali and alkaline earth metal bromites from the respective hypobromites, which comprises
    (a) adjusting the initial pH of an aqueous solution of a hypobromite, the cation of which is a metal ion selected from the group consisting of the alkali metal and alkaline earth metal ions, and containing about 200–300 grams per liter of available bromine, to a pH of about 10.5 to 11 so as to start spontaneous conversion of the hypobromite to the corresponding bromite,
    (b) maintaining the operating temperature of the solution below that temperature at which the bromite would be decomposed at the afore-said adjusted pH, which temperature ranges from about 0° C. to room temperature, until obtaining a primary bromite-enriched solution containing bromite and hypobromite, wherein the conversion of hypobromite to bromite has approximately attained a maximum for the respective pH and temperature, and
    (c) adding to the primary solution a metal hydroxide, the cation of which is the same as the cation of the hypobromite, in such amounts as to raise the adjusted pH of the solution to a range of about 12 to 12.9, so as to stop the conversion of hypobromite to bromite at the afore-said maximum, and simultaneously stabilize the resulting secondary bromite-containing solution.

2. The method claimed in claim 1, wherein the temperature of the solution is maintained at a level close to room temperature.

3. The method claimed in claim 1, wherein the temperature of the solution is maintained at about 0° C.

4. The method claimed in claim 1, wherein the adjustment of the initial pH is carried out by adding to the hypobromite solution a base containing the same cation as the hypobromite, when said initial pH is lower than the pH to which said solution is to be adjusted.

5. The method of producing concentrated solutions of alkali and alkaline earth metal bromites from the respective hypobromites, which comprises
    (a) adjusting the initial pH of an aqueous solution of a hypobromite, the cation of which is a metal ion selected from the group consisting of the alkali metal and alkaline earth metal ions, and containing about 200–300 grams per liter of available bromine, to a pH of about 10.5 to 11 so as to start spontaneous conversion of the hypobromite to the corresponding bromite,
    (b) maintaining the operating temperature of the solution below that temperature at which the bromite would be decomposed at the aforesaid adjusted pH, which latter temperature ranges from about 0° C. to room temperature, until obtaining a primary bromite-enriched solution containing bromite and hypobromite, wherein the conversion of hypobromite to bromite has approximately attained a maximum for the respective pH and temperature, (c) adding to the primary solution a metal hydroxide, the cation of which is the same as the cation of the hypobromite, in such amounts as to raise the adjusted pH of the solution to about 12 to 12.9, so as to stop the conversion of hypobromite to bromite at the aforesaid maximum, and simultaneously stabilize the resulting secondary bromite-containing solution, (d) adding an agent capable of reducing hypobromite to bromide and which is substantially inert to bromite, to the second bromite-containing solution so as to decompose any unconverted hypobromite and obtain a final concentrated bromite solution practically free from hypobromite.

6. A method of producing concentrated solutions of alkali and alkaline earth metal bromites from the respective hypobromites, which comprises (a) adjusting the initial pH of an aqueous solution of a hypobromite, the cation of which is a metal ion selected from the group consisting of the alkali metal and alkaline earth metal ions, and containing about 200–300 grams per liter of available bromine, to a pH of about 10.5 to 11 so as to start spontaneous conversion of the hypobromite to the corresponding bromite, (b) maintaining the operating temperature of the solution below that temperature at which the bromite would be decomposed at the aforesaid adjusted pH, which latter temperature ranges from about 0° C. to room temperature with increasing pH, until obtaining a primary bromite-enriched solution containing bromite and hypobromite, wherein the conversion of hypobromite to bromite has approximately attained a maximum for the respective pH and temperature, (c) adding to the primary solution a metal hydroxide, the cation of which is the same as the cation of the hypobromite, so as to raise the pH of the intermediary solution to at least 12.5, and thereby to stop the conversion of the hypobromite to bromite at the aforesaid maximum, and obtain a secondary solution of bromite and a minimum amount of unconverted hypobromite, and (d) adding to the secondary solution an aqueous ammonia solution in substantially stoichiometric proportion to the said amount of unconverted hypobromite in said secondary solution and maintaining the temperature at a level up to 0° C., so as to decompose substantially exclusively the unconverted hypobromite contained therein and obtain a final bromite solution substantially free from hypobromite.

7. A method of producing concentrated solutions of alkali and alkaline earth metal bromites from the respective hypobromites, which comprises (a) adjusting the initial pH of an aqueous solution of a hypobromite, the cation of which is a metal ion selected from the group consisting of the alkali metal and alkaline earth metal ions, and containing about 200–300 grams per liter of available bromine, to a pH of about 10.5 to 11 so as to start spontaneous conversion of the hypobromite to the corresponding bromite, (b) maintaining the operating temperature of the solution below that temperature at which the bromite would be decomposed at the aforesaid adjusted pH, which latter temperature ranges from about 0° C. to room temperature with increasing pH, until obtaining a primary bromite-enriched solution containing bromite and hypobromite, wherein the conversion of hypobromite to bromite has approximately attained a maximum for the respective pH and temperature, (c) adding to the primary solution a metal hydroxide, the cation of which is the same as the cation of the hypobromite, in such amounts as to raise the adjusted pH of the solution to about 12 to 12.9, so as to stop the conversion of hypobromite to bromite at the aforesaid maximum, and simultaneously stabilize the resulting secondary bromite-containing solution, and (d) adding to the secondary solution an aqueous ammonia solution in substantially stoichiometric proportion to the said amount of unconverted hypobromite in said secondary solution and maintaining the temperature between about −15° C. and 0° C., so as to decompose substantially exclusively the unconverted hypobromite contained therein and obtain a final bromite solution substantially free from hypobromite.

8. A method of producing a concentrated solution of sodium bromite from sodium hypobromite, which comprises (a) adjusting the initial pH of an aqueous sodium hypobromite solution containing about 200–300 grams per liter of available bromine, to a pH of about 10.5 to 11 so as to start spontaneous conversion of the sodium hypobromite to sodium bromite, (b) maintaining the operating temperature of the solution below that temperature at which the sodium bromite would be decomposed at the aforesaid adjusted pH, until obtaining a primary bromite-enriched solution containing sodium bromite and sodium hypobromite, wherein the conversion of the hypobromite to the bromite has approximately attained a maximum for the respective pH and temperature, (c) adding to the primary solution sodium hydroxide in such amounts as to raise the adjusted pH of the solution to about 12 to 12.9, so as to stop the conversion of sodium hypobromite to sodium bromite at the aforesaid maximum, and simultaneously stabilize the resulting secondary bromite-containing solution, and (d) adding to the secondary solution an aqueous ammonia solution in substantially stoichiometric proportion to the said amount of unconverted sodium hypobromtie in said secondary solution and maintaining the temperature at maximally 0° C., so as to decompose substantially exclusively the unconverted sodium hypobromite contained therein and obtain a final sodium bromite solution substantially free from sodium hypobromite.

9. The method claimed in claim 8, wherein the temperature of the solution of sodium hypobromite during its spontaneous conversion to sodium bromite is maintained at about 0° C.

10. A method of producing concentrated solutions of alkali and alkaline earth metal bromites from the respective hypobromites, which comprises (a) adjusting the initial pH of an aqueous solution of a hypobromite, the cation of which is a metal ion selected from the group consisting of the alkali metal and alkaline earth metal ions, in such amounts that the solution contains from about 200 to about 500 grams per liter of available bromine, to a pH in the range between 10.5 to 12, in the aforesaid aqueous hypobromite solution so as to start spontaneous conversion of the hypobromite to the corresponding bromite, (b) maintaining the operating temperature of the solution below that temperature at which the bromite would be decomposed at the aforesaid adjusted pH, which temperature ranges from about 0° C. to room temperature, until obtaining a primary bromite-enriched solution containing bromite and hypobromite, wherein the conversion of the hypobromite to the bromite has approximately attained a maximum for the respective pH and temperature, (c) adding to the primary solution a metal hydroxide, the cation of which is the same as the cation of the hypobromite, in such amounts as to raise the adjusted pH of the solution to a range of at least 12, so as to stop the conversion of hypobromite to bromite at the aforesaid maximum, and simultaneously stabilize the resulting secondary bromite-containing solution.

11. The method according to claim 10 wherein the cation in (a) is sodium, and wherein the temperature during the conversion of the sodium hypobromite to sodium bromite is maintained at about 0° C.

12. The method according to claim 10, wherein the cation in (a) is sodium, including the step of concentrating the resulting solution of bromite substantially free of hypobromite until it is substantially saturated in sodium bromite, bromate and bromide in the presence of sodium hydroxide, thereby obtaining a precipitation of sodium bromate and sodium bromide, separating said precipitated sodium bromate and sodium bromide, cooling the remaining solution to precipitate a solid containing more sodium bromite than is left in said solution, and separating the precipitated solid comprising essentially sodium bromite.

13. The method in accordance with claim 12 which includes dissolving the precipitated solid comprising essentially sodium bromite in an aqueous sodium hydroxide solution and crystallizing from the resulting solution substantially pure sodium bromite.

14. The method of producing solid, crystalline alkali and alkaline earth metal bromites from the respective hypobromites, which comprises (a) adjusting the initial pH of an aqueous solution of a hypobromite, the cation of which is a metal ion selected from the group consisting of the alkali metal and alkaline earth metal ions, which solution contains about 200-300 grams per liter of available bromine, to a pH of about 10.5 to 11, so as to start spontaneous conversion of the hypobromite to the corresponding bromite, (b) maintaining the operating temperature of the solution below that temperature at which the bromite would be decomposed at the aforesaid adjusted pH, until obtaining a primary bromite-enriched solution containing bromite and hypobromite, wherein the conversion of the hypobromite to the bromite has approximately attained a maximum for the respective pH and temperature, (c) adding to the primary solution a metal hydroxide, the cation of which is the same as the cation of the hypobromite, in such amounts as to raise the adjusted pH of the solution to at least 12, so as to stop the conversion of hypobromite to bromite at the aforesaid maximum, and simultaneously stabilize the resulting secondary bromite-containing solution, (d) adding an agent capable of reducing hypobromite to bromide, and which is substantially inert to bromite to the second bromite-containing solution so as to decompose any unconverted hypobromite and obtain a final bromite solution practically free from hypobromite, (e) concentrating the final bromite solution so as to precipitate a crude salt rich in bromite therefrom, (f) separating the precipitate from the mother liquor, and (g) recrystallizing the crude salt to obtain a substantially pure, crystalline bromite salt of the aforesaid cation.

15. A method of producing a concentrated solution of sodium bromite from a sodium hypobromite solution comprising the steps of (a) adjusting the initial pH of an aqueous sodium hypobromite solution prepared in a conventional manner and containing about 300-500 grams per liter of available bromine, to a pH of about 10.5 to 12, so as to start spontaneous conversion of the sodium hypobromite to sodium bromite, (b) maintaining the operating temperature of the solution below room temperature, until obtaining a primary enriched solution containing sodium bromite and sodium hypobromite, wherein the conversion of the hypobromite to the bromite has approximately attained a maximum for the respective pH and temperature, (c) adding to the primary solution sodium hydroxide in such amounts as to raise the adjusted pH of the solution to at least 12, so as to stop the conversion of sodium hypobromite to sodium bromite at the aforesaid maximum, and simultaneously stabilize the resulting secondary bromite-containing solution, and (d) adding to the secondary solution an aqueous ammonia solution in substantially stoichiometric proportion to the said amount of unconverted sodium hypobromite in said secondary solution and maintaining the temperature between −15° C. and 0° C., so as to decompose substantially exclusively the unconverted sodium hypobromite contained therein and obtain a final sodium bromite solution substantially free from sodium hypobromite.

16. Crystalline anhydrous sodium bromite having the following main interreticular spacings expressed in A. units and spectral line brightness values under powder spectroscopic examination:

| d | 4.38 | 3.66 | 3.20 | 2.95 | 2.90 | 2.88 | 2.52 | 2.35 | 2.07 |
|---|---|---|---|---|---|---|---|---|---|
| I | 25 | 9 | 11 | 19 | 100 | 10 | 3 | 60 | 6 |
| d | 1.97 | 1.90 | 1.84 | 1.82 | 1.56 | 1.51 | 1.48 | 1.44 | |
| I | 2 | 2 | 8 | 30 | 1 | 2 | 2 | 21 | |

17. Yellow crystals of $NaBrO_2 \cdot 3H_2O$ which, upon dehydration, yields anhydrous crystals having the following main interreticular spacings expressed in A. units and spectral line brightness values under powder spectroscopic examination:

| d | 4.38 | 3.66 | 3.20 | 2.95 | 2.90 | 2.88 | 2.52 | 2.35 | 2.07 |
|---|---|---|---|---|---|---|---|---|---|
| I | 25 | 9 | 11 | 19 | 100 | 10 | 3 | 60 | 6 |
| d | 1.97 | 1.90 | 1.84 | 1.82 | 1.56 | 1.51 | 1.48 | 1.44 | |
| I | 2 | 2 | 8 | 30 | 1 | 2 | 2 | 21 | |

18. The method described in claim 1, characterized in that the operating temperature of the solution under step (b) is maintained for a period of between 15 and 120 minutes.

19. The method of claim 1, wherein the adjustment of the initial pH is carried out by adding to the hypobromite solution, bromine when said initial pH is higher than the pH to which said solution is to be adjusted.

20. A method of producing alkali and alkaline earth metal bromites from their respective hypobromites which process comprises:

(a) adjusting the initial pH of an aqueous solution of a hypobromite, the cation of which is a metal ion selected from the group consisting of alkali metal and alkaline earth metal ions, and containing at least 200 grams per liter of available bromine to a pH of 10.5 to 12 so as to start spontaneous conversion of the hypobromite to the corresponding bromite, (b) maintaining the operating temperature of the solution below room temperature and below that temperature at which the bromite would be decomposed at the aforesaid adjusted pH, until obtaining a primary bromite-enriched solution containing bromite and hypobromite, wherein the conversion of hypobromite to bromite has approximately attained a maximum for the respective pH and temperature; and (c) adding to the primary solution a metal hydroxide, the cation of which is the same as the cation of hypobromite, in such amounts as to raise the adjusted pH in the solution to at least 12 so as to stop the conversion of hypobromite to bromite at the aforesaid maximum and simultaneously stabilize the resulting secondary bromite-containing solution.

References Cited in the file of this patent

Journ. of the Society of the Chemical Industry, vol. 25, page 5, published 1906, Richards, "The Existence of Bromous Acid ($HBrO_2$)."

Chemical Abstracts, vol. 33, page 2431, Josien, "Formation of Bromous Acid by Action of $Br_2$ on Silver Nitrate," published 1949.

Chem. Abst., vol. 42, page 7188, Sourisseau, "Formation of $HBrO_2$ in Silver Salt Solutions of $Br_2$," published 1948.

Journal of Amer. Chem. Soc., vol. 76, pages 2010-15, Engle et al., "The Decomposition of Hypobromite and Bromite Solutions" (see especially page 2012), published 1954.

Clarens: Article in Comptes Rendu, volume 157, page 217 (1913).